United States Patent [19]
Beck et al.

[11] 3,789,097
[45] Jan. 29, 1974

[54] PROCESS FOR PRODUCING PELLETIZED METAL SULFIDE MATERIALS

[75] Inventors: Russell R. Beck; David B. George; Charles W. Anderson, all of Salt Lake City, Utah

[73] Assignee: Kennecott Copper Corporation, New York, N.Y.

[22] Filed: Aug. 2, 1971

[21] Appl. No.: 168,003

[52] U.S. Cl. ................................ 264/82, 264/117
[51] Int. Cl. ............................................ B01j 2/04
[58] Field of Search .................... 264/82, 117; 75/3

[56] References Cited
UNITED STATES PATENTS
3,536,475  10/1970  Trub .................................. 264/117
1,444,467   2/1923  Jonsson ............................... 264/82

FOREIGN PATENTS OR APPLICATIONS
702,762   1/1954  Great Britain ........................... 75/3

Primary Examiner—Robert F. White
Assistant Examiner—J. R. Hall
Attorney, Agent, or Firm—Philip A. Mallinckrodt et al.

[57] ABSTRACT

A process of producing pelletized metal sulfide material bonded by reaction products of lime contacted by sulfur dioxide, so that the resulting pellets will have cohesive strength capable of withstanding the rough handling normally received in industrial smelting operations, comprises the steps of forming green pellets from a metal sulfide agglomerate prepared by mixing particulate metal sulfide material with lime in the presence of sufficient water to form a cohesive mixture, and of exposing the pellets to an effective amount of sulfur dioxide gas (which in the presence of moisture is converted to sulfurous acid) to react with the lime at temperatures ranging from room temperature to 100°C. to form calcium sulfite and calcium sulfate bonding agents. The hardness of the resulting pellets is increased many times over that achieved by the usual procedure of simple drying of metal sulfide material to form pellets which disintegrate prematurely when employed in commercial smelting operations. If a greater degree of hardness is necessary for some applications, the bonded pellets of the invention can be subjected to higher temperatures, imparting a degree of hardness to the pellets related to the temperature to which the pellets are exposed and the length of time of exposure.

8 Claims, 1 Drawing Figure

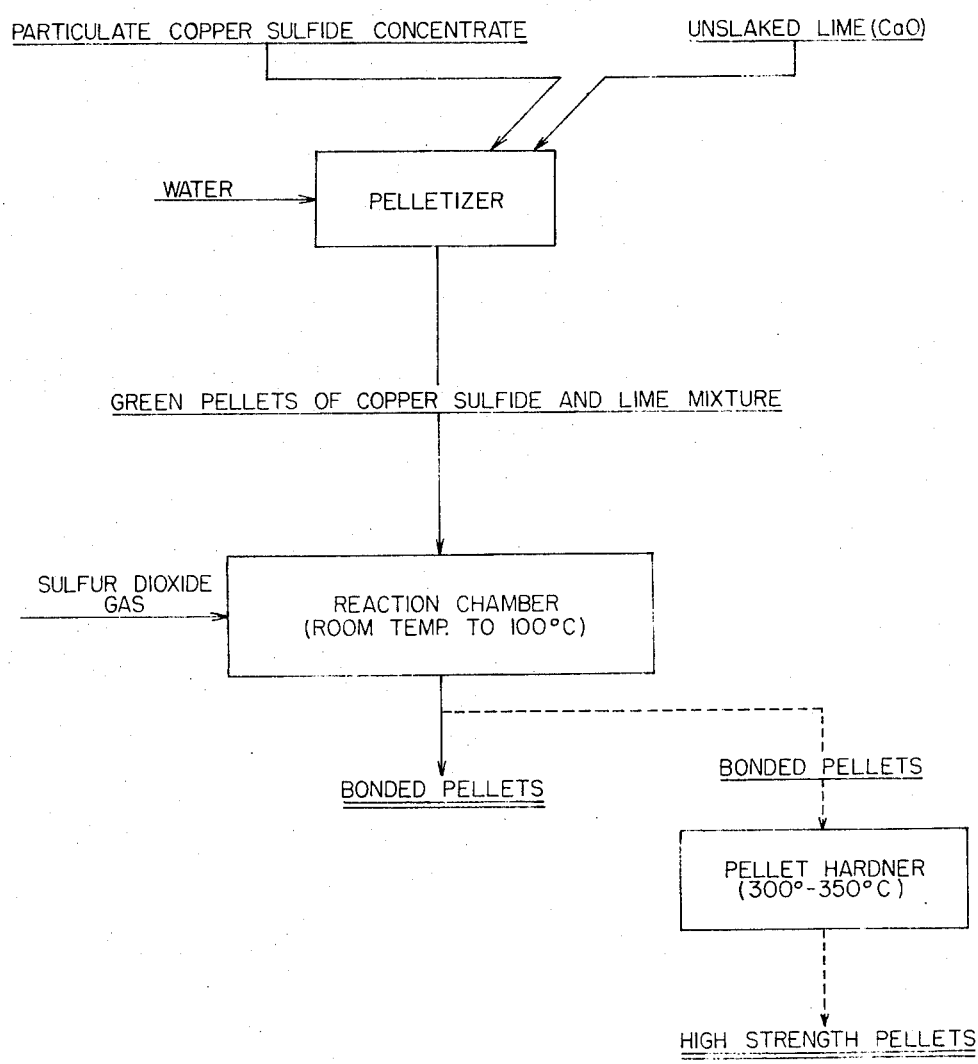

PROCESS FOR PRODUCING PELLETIZED METAL SULFIDE MATERIALS

BACKGROUND OF THE INVENTION

1. Field:

This invention is in the field of processes for producing metal sulfide concentrate pellets as prepared for industrial smelting operations.

2. State of the Art:

It has been costumary to prepare finely divided metal sulfide ores and concentrates for smelting by agglomerizing and compacting the particulate material in the form of pellets, briquettes, or other shapes. In many instances a binder has been added to aid in holding the compact together in its shaped form. Upon exposure to heat, the agglomerated particulate material is bound together in one way or another. In most instances only a very weak bond is formed. Extremely high temperatures and the presence of uneconomical amounts of bonding agents have been necessary to provide pellets with the requisite strength to withstand the rough handling normally incident to industrial smelting operations.

It has been proposed heretofore to simply expose damp pelletized agglomerations having no bonding agents therein to a stream of heated air in order to form a reaction product with the metal sulfides and thereby achieve a certain degree of strength. However, such a process requires expensive equipment, and the degree of hardness achieved is insufficient.

SUMMARY OF THE INVENTION

In accordance with the invention, a cohesive mixture of finely divided metal sulfide, lime, and sufficient moisture to provide green strength for shape retention is pelletized, and the resulting green pellets are exposed to sulfur dioxide gas to produce sulfurous acid for reaction with the lime to effect low temperature bonding of the pelletized material.

The degree of hardness achieved by the pellets is dependent upon the concentration of the sulfur dioxide gas, the amount of moisture present, the temperature, and the length of time permitted for the bonding reaction to take place. However, we have found that adequate bonding to withstand the rigours of handling as feed material for industrial smelters can be attained by conducting the reaction anywhere from room temperature to 100°C. If still further hardness is desired, the bonded pellets can be exposed to higher temperatures, e.g. from about 300°C. to about 350°C., which significantly increases the degree of hardness.

The process is applicable to any finely divided metallic sulfide ore concentrate or the like, and is especially useful as applied to copper, zinc, lead, manganese, cobalt, nickel, and iron sulfides.

THE DRAWING

The single FIGURE of the accompanying drawing is a flowsheet representing the best mode presently contemplated for carrying out the invention as applied to copper sulfide concentrates using unslaked lime as the bonding agent.

DETAILED DESCRIPTION OF THE ILLUSTRATED EMBODIMENT

As illustrated, a quantity of copper sulfide concentrate is mixed with unslaked lime (CaO) and water in a standard pelletizer to form shape-retaining pellets. For best results, at least 2 percent by weight of the lime should be used and only enough water to provide a workable mass.

The uncured or "green" pellets are exposed to sulfur dioxide gas within a reaction chamber. In order to provide the moisture necessary to convert the sulfur dioxide to sulfurous acid, the gas is preferably saturated with water before introduction into the reaction chamber. The sulfurous acid, in turn, reacts with the lime to produce calcium sulfites and calcium sulfates, which serve as settable bonding agents for the particles of metallic sulfides. The resulting product is a quantity of bonded pellets capable of withstanding the rough handling normally accompanying their use as smelter feed.

Bonding can be effected at a temperature of about room temperature to 100°C. At these temperatures the pellets should have sufficient residence time in the reaction chamber to develop a greater degree of hardness than would be attainable without the sulfur dioxide treatment.

Under certain circumstances, it may be desirable to produce bonded pellets which have even greater hardness and cohesive strength. In these instances, the bonded pellets can be further subjected to heating at a temperature of approximately 300°C. to 350°C. Such a heating step strengthens the interparticulate bonds formed during the treatment of the green pellets with sulfur dioxide gas.

A series of tests were conducted to determine the relative strengths of the pellets at various stages of the process. The device employed consisted of two horizontal metal plates with one of the plates attached to means for exerting and measuring pressure applied against the other plate. The pellets were inserted between the two plates and the pressure in pounds was determined at the point of disintegration of the pellets. Green pellets having a size range of +1/4 to −7/16 inch, which had been permitted to dry without exposure to the sulfur dioxide gas stream, exhibited strengths of from 3.2 to 17.2 pounds p.s.i., depending on the drying conditions. Pellets of this strength are not suitable for use as smelter feed. Pellets exposed to sulfur dioxide gas to form calcium sulfite and sulfate bonds in accordance with the invention exhibited strength of 60 pounds p.s.i. upon drying to eliminate the original moisture, and held up in a most satisfactory manner under normal handling conditions.

Those pellets which were subjected to the additional step of high temperature drying exhibited crushing strengths in excess of 80 pounds. The bonded pellets which had been exposed to the sulfur dioxide gas stream and then dried evidenced sufficient cohesive strength at 60 pounds to meet the current requirements for materials handling in copper smelters. It is contemplated that only under unusual circumstances would the additional high temperature drying step be necessary to produce pellets able to withstand unusual and very harsh materials handling conditions.

Although the particulate copper sulfide flotation concentrate is decribed herein in detail with regard to the process of the invention, it should be understood that the process is equally applicable to the pelletizing of other metal sulfide material, such as zinc, lead, cobalt, nickel, manganese, molybdenum, and iron sulfides.

Slaked lime ($CaOH_2$) or limestone ($CaCO_3$) can be substituted for the unslaked lime as the bonding agent. The concentration of lime in the agglomerate should not be less than about 2 percent by weight calcium oxide in the agglomerate to produce bonded pellets having the minimum strength necessary to withstand the handling procedures incident to the smelting operations. Above about 15 percent calcium oxide is deemed unnecessary to provide the strength necessary, although greater amounts of calcium oxide can be employed. In general, it has been found that adequate strengths have been produced by utilizing from about 3 to 6 percent calcium oxide in the agglomerate.

Sufficient water must be present in the agglomerate to adhere the concentrate and the lime bonding agent together in the form of pellets, briquettes, or other shapes. Most conventional pelletizing machines in use today require a minimum of approximately 5 percent moisture in the sulfide-lime mixture in order to produce a satisfactorily adherent "green" pellet. Less moisture can of course be employed if the pellet will retain its shape and avoid disintegration during the following sulfation step. In general, the presence of approximately 10 to 12 percent by weight water in the mixture produces a pellet with sufficient green strength to withstand handling during the sulfation step. The presence of moisture above about 20 to 25 percent by weight in the mixture tends to produce a somewhat fluid mixture not amenable to pellet formation.

After the sulfide-lime mixture has been formed in pellets, it is preferred to introduce the still moist pellets into the sulfur dioxide gas stream for sulfation. In general, there should be a minimum of about 2 percent by weight water present at the reaction site in order to effect the desirable bonding of the pellets. This moisture can be present either in the form of moisture within the pellets themselves, and/or through moisture contained in the sulfur dioxide gas stream, for example by means of a partially or completely saturated sulfur dioxide gas.

The temperature of the reaction between sulfur dioxide and the calcium oxide in the pellets can range from ambient temperature to the volatilization temperature of water. Temperatures higher than the volatilization point of water should not be employed unless in an autoclave since the vaporized water creates greater difficulties in producing sulfurous acid from the sulfur dioxide. In general it has been found that the optimum operating temperature is between approximately 50°C. and 90°C. However, temperatures down to the ambient temperature are acceptable if the concentration of sulfur dioxide in the gas stream is high and sufficient water is contained in the green pellets to provide the necessary moisture.

The concentration of sulfur dioxide gas to be introduced to the reaction site is variable and can range from approximately 5 to 100 percent sulfur dioxide. Concentrations lower than about 5 percent are operable but require much longer reaction times in order to strengthen the pellets. As noted, there are three variables which depend upon each other for the relative amounts of each in any given reaction. These variables include the temperature of the reaction site, the amount of moisture present at the reaction site, and the concentration of the sulfur dioxide in the gas stream. In general, as the temperature decreases, the concentration of sulfur dioxide should increase and the amount of moisture present at the site should also increase. If small amounts of moisture are present, then the sulfur dioxide gas concentration should increase proportionally.

The sulfation reaction initially hardens the exterior portion of the pellet. As the reaction proceeds, the interior of the pellet is hardened. The degree of hardness attained is determined by the thickness of the sulfated portion of the pellet.

Although the bonded pellets are preferably further hardened by exposure to temperatures from about 300°C. to about 350°C., exposure of the pellets to temperatures above about 100°C. will produce additional hardening.

EXAMPLE

Two thousand grams moist (10 percent moisture) copper sulfide concentrate were mixed with 72 grams CaO (slaked lime). The mixture was placed in a three-foot disk pelletizer and water was sprayed onto the mixture to form moist green pellets of the mixture. The pellets contained approximately 12–13 percent water.

The pellets were screened and only the +1/4 to −7/16 inch fraction was saved and divided into a 500 gram batch and a 1000 gram batch.

Batch 1, containing 500 grams of green pellets was dried in a 105°C drying oven and the hardness or strength determined by crushing the pellets. The strengths of the dried pellets ranged from 4.2 pounds to 21 pounds with an average strength of 16.9 pounds.

Batch 2, containing 1000 grams of the green pellets, was subjected to sulfation. The pellets were placed in a boat, and this in turn was inserted in a small tube furnace. $SO_2$ gas bubbled through warm (60°C) water to partially saturate it, and the gas was passed through the tube furnace contacting the green pellets. The $SO_2$ concentration was maintained at 16 percent $SO_2$ balance-air and the pellets were heated to 80°C. After one hour 50 minutes, the pellets were removed from the furnace and allowed to cool. The pellets were divided into two batches of approximately 500 grams each. One batch was tested for strength and the results are below:

+¼ to −½ inch pellets — 30 tested
Low – 37 lbs.
High – 73 lbs.
Average – 56 lbs.

The other sulfated pellets were heated in an open pan to 325°C by placing in a small globar furnace. The pellets were removed in 30 minutes and tested for strength.

+¼ to −½ inch pellets — 25 tested
Low – 49 lbs.
High – 87 lbs.
Average – 74 lbs.

The weight loss or gain during heat hardening was not determined.

Whereas, this invention is here illustrated and described with respect to certain preferred procedures thereof, it is to be understood that many variations are possible without departing from the inventive concepts particularly pointed out in the claims.

We claim:

1. A process for making pellets of metal sulfide materials bonded together with a bonding agent comprising calcium sulfites and calcium sulfates, said process comprising the steps of:
  a. mixing particulate metal sulfide material in the presence of aqueous moisture with an amount of lime-bearing material to provide at least about 2 percent calcium oxide by weight in the mixture, said moisture being present in an amount sufficient to form a cohesive mixture capable of being shaped into pellets;
  b. forming the mixture into pellets; and
  c. contacting the so formed pellets with a sufficient amount of sulfur dioxide gas at a sufficiently high temperature between ambient and the volitilization temperature of water for a sufficient period of time to bond the agglomerated particulate metal sulfides in the pellets together with calcium sulfites and calcium sulfates, said calcium sulfites and calcium sulfates being formed by the reaction of aqueous moisture with said sulfur dioxide gas, there being at least 2 percent by weight aqueous moisture present to convert said sulfur dioxide gas into sulfurous acid for reacting with the lime to form said calcium sulfites and calcium sulfates.

2. A process as set forth in claim 1, wherein the amount of moisture present in step (a) is such that the pellets formed contain from about 5 percent to about 20 percent water.

3. A process as set forth in claim 1, wherein the amount of lime-bearing material present in step (a) is such as to provide from about 3 – 6 percent calcium oxide by weight in the mixture.

4. A process as set forth in claim 1, wherein the lime-bearing material is slaked calcium oxide.

5. A process as set forth in claim 1, wherein the temperature of reaction is step (c) is between about 50° C. and about 90° C.

6. A process as set forth in claim 1, wherein the bonded pellets following the contact with sulfur dioxide, are additionally subjected to a heating step at a temperature above 100°C. for a period of time sufficient to further harden the pellets.

7. A process as set forth in claim 6, wherein the temperature of the heating step is from about 300°C to about 350°C.

8. A process as set forth in claim 1, wherein the metal sulfide material is made up of copper sulfide metallurgical concentrates.

* * * * *